(12) United States Patent
Fishman et al.

(10) Patent No.: US 8,104,950 B2
(45) Date of Patent: Jan. 31, 2012

(54) AVOIDING AIR FLOW PENETRATION IN TEMPERATURE MEASUREMENT

(75) Inventors: Alex Fishman, Sunnyvale, CA (US); Peter A. Scranton, Hayword, CA (US); Ramesh Sundaram, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 645 days.

(21) Appl. No.: 12/330,360

(22) Filed: Dec. 8, 2008

(65) Prior Publication Data

US 2009/0147820 A1    Jun. 11, 2009

Related U.S. Application Data

(60) Provisional application No. 61/012,314, filed on Dec. 7, 2007.

(51) Int. Cl.
*G01K 15/00* (2006.01)
*G01K 7/16* (2006.01)

(52) U.S. Cl. ............................................. 374/1; 374/185

(58) Field of Classification Search .................. 374/1, 2, 374/185, 179, 180, 181, 182, 183
See application file for complete search history.

(56) References Cited

U.S. PATENT DOCUMENTS

| | | | | |
|---|---|---|---|---|
| 4,643,586 A * | 2/1987 | Hansen | ............................. | 374/1 |
| 5,470,251 A * | 11/1995 | Sano | ............................. | 439/489 |
| 5,669,713 A * | 9/1997 | Schwartz et al. | ................. | 374/1 |
| 5,829,876 A * | 11/1998 | Schwartz et al. | ................. | 374/1 |
| 6,045,260 A * | 4/2000 | Schwartz et al. | ............. | 374/183 |
| 6,908,224 B2 * | 6/2005 | Schneider et al. | ................ | 374/1 |
| 7,744,276 B2 * | 6/2010 | Webb | ............................ | 374/179 |
| 2009/0147820 A1 * | 6/2009 | Fishman et al. | .................. | 374/1 |

* cited by examiner

*Primary Examiner* — Yaritza Guadalupe
(74) *Attorney, Agent, or Firm* — Maschoff Gilmore & Israelsen

(57) ABSTRACT

In one example embodiment, a board for measuring device temperatures comprises a base and one or more fingers extending from the base. The base and the one or more fingers comprise a flexible material. One or more first temperature sensors are disposed on the one or more fingers. One or more second temperature sensors are disposed on the base. Each of the first and second temperature sensors comprises a partially thermally isolated temperature sensor.

20 Claims, 8 Drawing Sheets

AVOIDING AIR FLOW PENETRATION IN TEMPERATURE MEASUREMENT

CROSS-REFERENCE TO RELATED APPLICATIONS

The present application claims the benefit of and priority to U.S. Provisional Application Ser. No. 61/012,314, entitled "AVOIDING AIR FLOW PENETRATION IN TEMPERATURE MEASUREMENT," filed Dec. 7, 2007, which application is fully incorporated herein by reference in its entirety.

BACKGROUND

1. The Field of the Invention

The present invention relates generally to optoelectronic device calibration. More particularly, embodiments of the invention relate to systems and methods for accurately measuring the air temperature and operating temperature of optoelectronic devices within a test box.

2. The Related Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g. referred to as a "laser driver" when used to drive a laser signal) configured to control the operation of the optical transmitter in response to various control inputs. The optical transceiver also generally includes an amplifier (e.g. often referred to as a "post-amplifier") configured to amplify the channel-attenuated received signal prior to further processing. A controller circuit (hereinafter referred to as the "controller") controls the operation of the laser driver and post-amplifier.

The operation of the optical transceiver is susceptible to its operating environment. For example, temperature can change the operating characteristics of the optical transmitter itself. In particular, the wavelength output of a laser may drift from approximately 0.3 nanometers (nm) to approximately 0.6 nm for every one degree Celsius change in temperature. Since lasers generate heat during operation, this can have a significant effect upon the operation of the laser. Wavelength variations can cause crosstalk, where one transmission becomes confused with another. Furthermore, varying wavelengths due to varying laser temperature may cause different fiber attenuations in the optical signal. Changes in wavelength can be particularly problematic when multiple closely packed wavelength channels are transmitted over any given physical channel. Accordingly, temperature has great influence over the proper operation of the optical transceiver.

Some high performance optical transceivers include a Thermo Electric Cooler (TEC) which cools or heats the optical transceiver as appropriate to counteract the heating or cooling effect of the surrounding environment. However, even with such countermeasures, there is still some variance in temperature of the laser itself. In order to further improve the performance of the laser, the laser bias current may be adjusted to further counteract the effects of temperature on the operating wavelength of the laser.

The transmitter itself (e.g., the laser) may have some uncertainty in its operating performance due to the inherent variances in semiconductor processing technologies. Even lasers of the same type having undergone the same manufacturing processes may have different temperature/laser bias current dependencies. Accordingly, it is often necessary for high performance and high speed applications, to individually calibrate each optical transceiver with a temperature/laser bias current table. The optical transceiver then refers to the table when deciding what laser bias current magnitude to bias the laser with given the current temperature.

Often a Bit Error Rate Tester (BERT) device may be used in conjunction with a temperature-regulated environment or test box to properly calibrate each optical transceiver. The capabilities of the BERT and the test box determine the number of optical transceivers that may be calibrated at the same time. For instance, a four-channel BERT and a test box having four test slots may be used to calibrate four optical transceivers at a time. The four optical transceivers are placed in the test box and connected to the BERT. The BERT provides a test signal to each of the transceivers, counts the number of transmission errors in the optical signals produced by each transceiver, and the optical transceivers can then adjust one or more operating parameters, such as laser bias current, to minimize the transmission errors. At the same time, temperature-regulated air is cycled through the test box and temperature sensors within the test box may measure the temperature of the air and/or the operating temperatures of the optical transceivers. The operating temperatures measured by the test box are provided to the optical transceivers, which compare the received operating temperature measurements to operating temperature measurements made by temperature sensors within the optical transceivers themselves. In this manner, each optical transceiver can calibrate its internal temperature sensor(s) and update its temperature/laser bias current table.

The temperature of the environment within such test boxes is often regulated by an external system, which can increase or decrease the temperature of the air flowing through the test box. Temperature sensors within the test box for measuring the transceiver operating temperatures can provide inaccurate results when exposed to the air flow. Since these measurements are provided to the optical transceivers to calibrate the internal sensors of the transceivers, inaccurate measurements can adversely affect the calibration of the transceivers' internal sensors.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

In general, example embodiments of the invention relate to devices, systems and methods for accurately measuring the air temperature and operating temperature of devices within a test box.

In one example embodiment, a board for measuring device temperatures comprises a base and one or more fingers extending from the base. The base and the one or more fingers comprise a flexible material. One or more first temperature sensors are disposed on the one or more fingers. One or more second temperature sensors are disposed on the base. Each of the first and second temperature sensors comprises a partially thermally isolated temperature sensor.

In another example embodiment, a system for calibrating a plurality of devices comprises a test box and a board. The test box includes a cover, a first opening for receiving temperature-regulated air, a second opening for discharging the temperature-regulated air, and one or more test slots for receiving one or more devices. The board is coupled to the cover and comprises one or more fingers and a plurality of partially thermally isolated temperature sensors. The plurality of partially thermally isolated temperature sensors exceeds in quantity the one or more fingers. When the cover is closed and one or more devices are received in the one or more test slots, one or more of the plurality of partially thermally isolated temperature sensors are thermally coupled to the one or more devices.

In yet another example embodiment, a method for calibrating one or more internal temperature sensors of one or more devices includes cycling temperature-regulated air through a test box. Master measurements of the temperature of the temperature-regulated air are periodically obtained by a master sensor. A plurality of partially thermally isolated temperature sensors included on a board in the test box are calibrated. One or more devices are placed within the test box, each device having one or more internal temperature sensors. The devices are operated within the test box. Operating temperatures of the devices are measured using at least one of the plurality of partially thermally isolated temperature sensors. The operating temperature measurements are provided to the devices. Each of the devices compares operating temperature measurements to operating temperature measurements obtained by the device's internal temperature sensors and records any variance in memory of the device.

These and other aspects of example embodiments of the invention will become more fully apparent from the following description and appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

In general, embodiments of the invention are concerned with calibrating optoelectronic devices. More particularly, some example embodiments of the invention enable the use of partially thermally isolated temperature sensors to accurately measure the air temperature and/or the operating temperature of optoelectronic devices placed within a test box in order to calibrate internal temperature sensors within the optoelectronic devices. The partially thermally isolated temperature sensors can minimize the effects of air flow penetration, producing a more reliable temperature measurement and improved calibration of the optoelectronic devices.

Embodiments of the invention can be implemented in various optoelectronic devices. As used herein, the term "optoelectronic device" includes devices having both optical and electrical components. Examples of optoelectronic devices include, but are not limited to, transponders, transceivers, transmitters, and/or receivers. Optoelectronic devices can be used, for instance, in telecommunications networks, local area networks, metro area networks, storage area networks, wide area networks, and the like and can be configured to conform with one or more standardized form factors or multi-source agreements ("MSAs"). It will be appreciated, however, that the optoelectronic devices need not comply with standardized form factor requirements and may have any size or configuration necessary according to a particular design.

Optoelectronic devices according to embodiments of the invention can be configured for optical signal transmission and reception at a variety of per-second data rates including, but not limited to, 1 Gigabit per second ("G"), 2G, 4G, 8G, 10G, 40G, 100G, or higher. As used herein, the terms "1G", "2G", and similar terms represent rounded approximations of common signaling rates and have the meanings commonly understood by those of skill in the art.

Furthermore, the optoelectronic devices according to embodiments of the invention can be configured for optical signal transmission and reception at various wavelengths including, but not limited to, 850 nm, 1236 nm, 1470 nm, 1490 nm, 1410 nm, 1530 nm, 1550 nm, 1570 nm, 1590 nm, or 1510 nm. Further, the optoelectronic devices can be configured to support various transmission standards including, but not limited to, 10 Gigabit Ethernet, 100 Gigabit Ethernet, and 1×, 2×, 4×, and 10× Fibre Channel.

Reference will now be made to the drawings to describe various aspects of embodiments of the invention. It should be understood that the drawings are diagrammatic and schematic representations of such exemplary embodiments and, accordingly, are not limiting of the scope of the present invention, nor are the drawings necessarily drawn to scale.

I. Example Operating Environment

Figure 1:
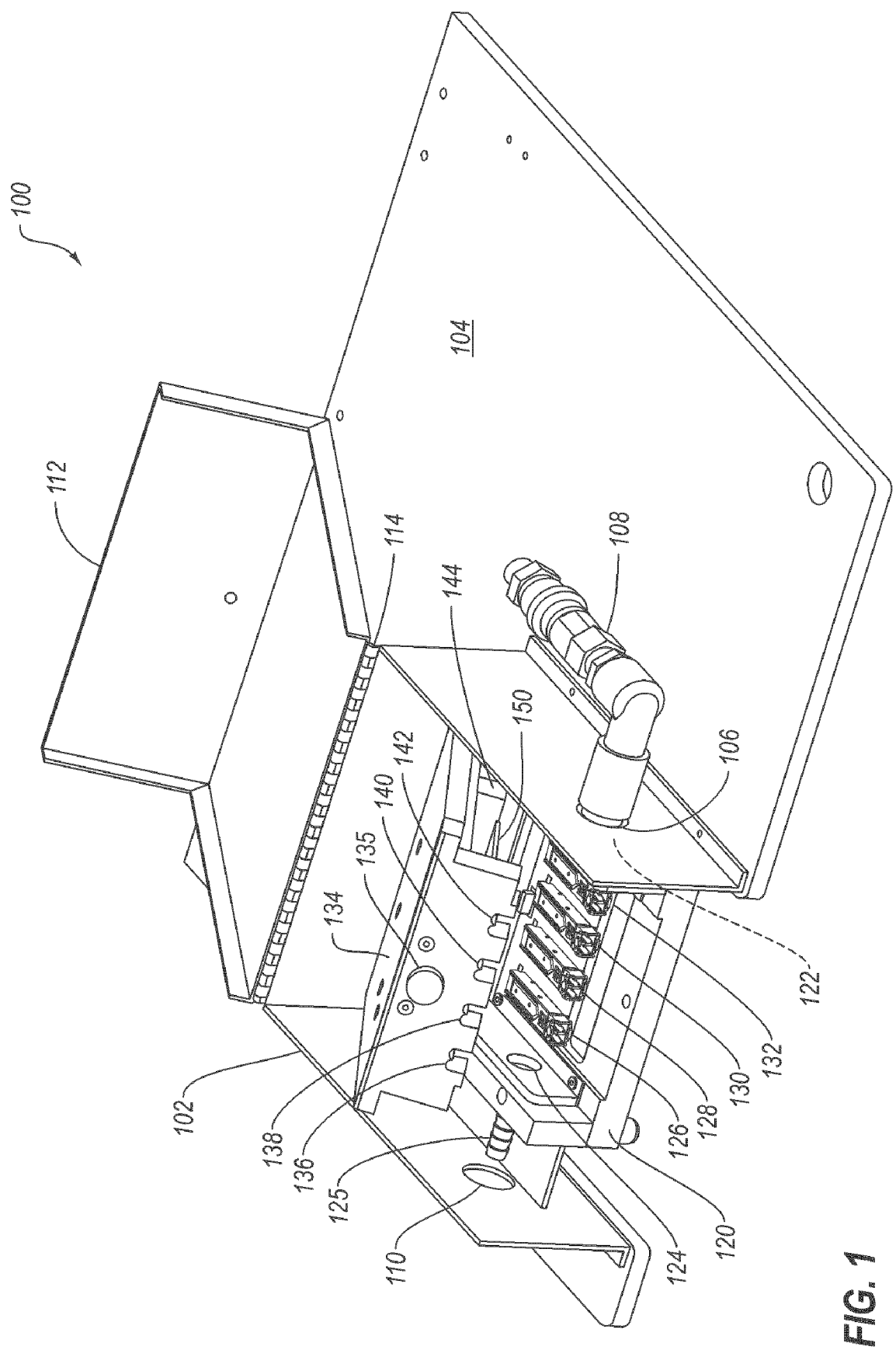
FIG. 1 illustrates an example operating environment in which partially thermally isolated temperature sensors according to embodiments of the invention may be implemented to accurately calibrate optoelectronic devices.

FIG. 1 illustrates an example operating environment, denoted generally at 100, in which some embodiments of the invention may be practiced. While the operating environment 100 will be described in some detail, the operating environment 100 is described by way of illustration only, and not by way of restricting the scope of the invention.

The operating environment 100 includes an outer box 102 mounted to a base 104. The outer box 102 includes a first opening 106 through which temperature-regulated air may be provided while calibrating one or more temperature sensors of each of one or more optoelectronic devices within the outer box 102. Devices placed within the outer box 102 for calibration may be referred to herein as devices under test (DUTs).

The temperature-regulated air provided through first opening 106 may be supplied by a master system (not shown) and in a typical embodiment the temperature of the air ranges from −40 degrees Celsius to 85 degrees Celsius, although colder or hotter temperatures may also be used. Various entrance fittings 108 are provided for interfacing the first opening 106 with the master system (not shown). The outer box 102 also includes a second opening 110 through which the air entering through the first opening 106 may be discharged. The outer box 102 may include a movable top cover 112 attached to the outer box 102 with a hinge or other attachment means 114.

Disposed within the outer box 102 is an inner box 120. Similar to the outer box, the inner box 120 also includes a first opening 122 and a second opening 124. The first opening 122 of the inner box 120 may be coupled to the first opening 106 of the outer box 102 for receiving temperature regulated air and the second opening 124 of the inner box may have a discharge fitting 125 through which the temperature regulated air may be discharged. According to one embodiment, a tube or hose may connect to the discharge fitting 125 through the second hole 110 of the outer box for the purpose of carrying the temperature regulated air out of the inner box 120. The disposition of the inner box 120 within the outer box 102 substantially prevents the formation of condensation on the inner box 120 in one example, which may otherwise occur under some circumstances.

The inner box 120 includes one or more test slots (not shown) for receiving one or more DUTs 126, 128, 130 and 132. In some example embodiments, the DUTs 126, 128, 130 and 132 comprise optical transceivers conforming to the small form factor pluggable (SFP) multi-source agreement (MSA), although in other embodiments the DUTs may comprise optical transceivers or transponders of other form factors such as XENPAK, XFP, or the like. The inner box 120 includes a cover 134 attached to the inner box 120 with a hinge or other attachment means (not shown). The cover 134 may be opened and closed in some embodiments using the knob 135.

In some embodiments, optical fibers are coupled to the optical interfaces of the DUTs 126, 128, 130 and 132. A plurality of recesses 136, 138, 140 and 142 may be disposed along the bottom edge of the front plate of the cover 134, each recess corresponding to a different DUT and designed to receive the one or more optical fibers coupled to a corresponding DUT. Typically, the plurality of recesses are designed to permit the egress of the optical fibers from the inner box 120 while minimizing the amount of temperature regulated air which may exit through the recesses.

Coupled to a flange 144 extending from the underside of the cover 134 is a multi-fingered board 150. The multi-fingered board 150 has a plurality of fingers and at the end of each of the fingers one or more partially thermally isolated (PTI) temperature sensors (not shown) may be disposed. The multi-fingered board 150, described in greater detail below, extends from the flange 144 at an angle below the plane of the top of the cover 134. Each of the fingers of the board 150 corresponds to one of the DUTs 126, 128, 130 and 132. When the cover 134 is closed and DUTs have been placed in the four test slots of the inner test box 120, each of the fingertip PTI temperature sensors (not shown) is placed in thermal contact with a different one of the DUTs. If no DUTs have been placed in any of the four test slots, the fingertip PTI temperature sensors are typically not in thermal contact with anything other than the air inside the inner test box 120. Typically, the PTI temperature sensors are positioned such that they are configured to contact the DUTs at an optimal location for sensing temperature of the DUTs. In some examples, the optimal location for sensing temperature of a DUT is as close to the laser of the DUT as possible, although other locations may be used for calibration purposes.

II. Multi-Fingered Board

Figure 2B:
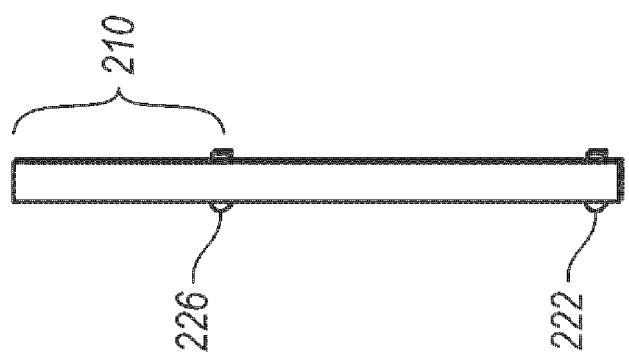
FIGS. 2A-2D disclose aspects of an example multi-fingered board and example partially thermally isolated temperature sensors that can be implemented in the operating environment of FIG. 1.
Figure 2A:
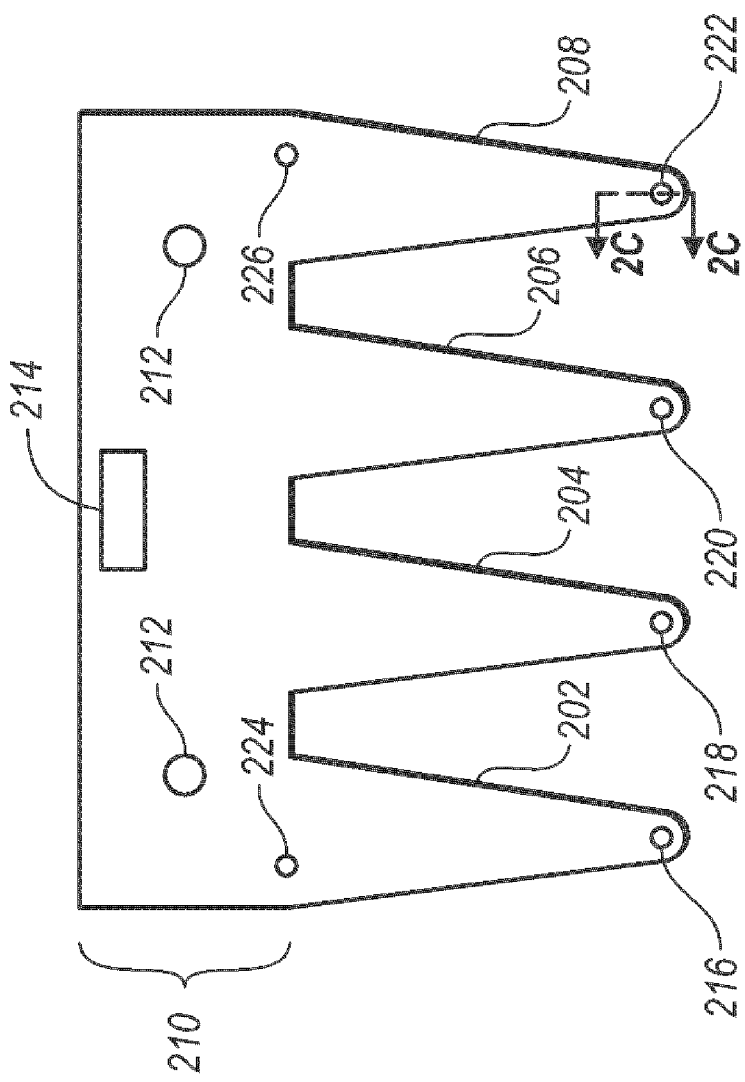

Features of the present invention may be better understood with reference now to FIGS. 2A and 2B, depicting in greater detail a multi-fingered board 200, which may correspond to the multi-fingered board 150 of FIG. 1. FIG. 2A offers a top view while FIG. 2B offers a side view of the multi-fingered board 200.

The multi-fingered board 200 comprises a plurality of fingers 202, 204, 206 and 208 extending from a base 210. The fingers 202-208 and base 210 may comprise a flexible material in some embodiments. The multi-fingered board 200 further comprises a plurality of through holes 212 extending through the base 210 which may be used to couple the multi-fingered board 200 to a test box (not shown), via a flange of the test box, for instance, and a connector area 214 to which a connector (not shown) may be coupled for communicating electrical signals to and from the multi-fingered board 200. The electrical signals may comprise, for instance, supply currents and/or data such as temperature measurements. The connector, in turn, can provide data received from the multi-fingered board 200 to a processor (not shown) or a BERT (not shown) which may be used in conjunction with some embodiments of the invention.

Data may be collected by the multi-fingered board 200 from a plurality of PTI temperature sensors, including a plurality of fingertip sensors 216, 218, 220 and 222 disposed in or near the tips of the plurality of fingers 202-208, respectively. Alternately or additionally, each finger 202-208 may include more than one fingertip sensor 216-22, respectively. Alternately or additionally, the PTI temperature sensors can include a plurality of additional sensors 224 and 226 disposed in or near the base 210.

Relative to the view illustrated in FIG. 2A, in FIG. 2B the multi-fingered board 200 has been rotated 90 degrees into the page. Due to the angle of view in FIG. 2B, only fingertip sensor 222 and additional sensor 226 are visible in FIG. 2B, as the fingertip sensors 216-220 are obscured by fingertip sensor 222 and the additional sensor 224 is obscured by the additional sensor 226. While not drawn to scale, FIG. 2B illustrates how the multi-fingered board 200 can be thin relative to its height and width. For instance, in some embodiments the multi-fingered board 200 may be about 30 mils (e.g. thirty one-thousandths of an inch) thick, about 2.8 inches tall (e.g. from base to fingertips) and about 3.8 inches wide (e.g. from left side of base to right side of base).

In some embodiments of the invention, the multi-fingered board 200 comprises a flexible material. The multi-fingered board 200 may also have a low coefficient of thermal conductivity so as not to interfere with temperature measurements of the PTI temperature sensors 216-226. Furthermore, although the multi-fingered board 200 has been described as including four fingers 202-208, embodiments of the invention include boards having as few as one finger or more than four fingers.

III. PTI Temperature Sensor

Figure 2C:
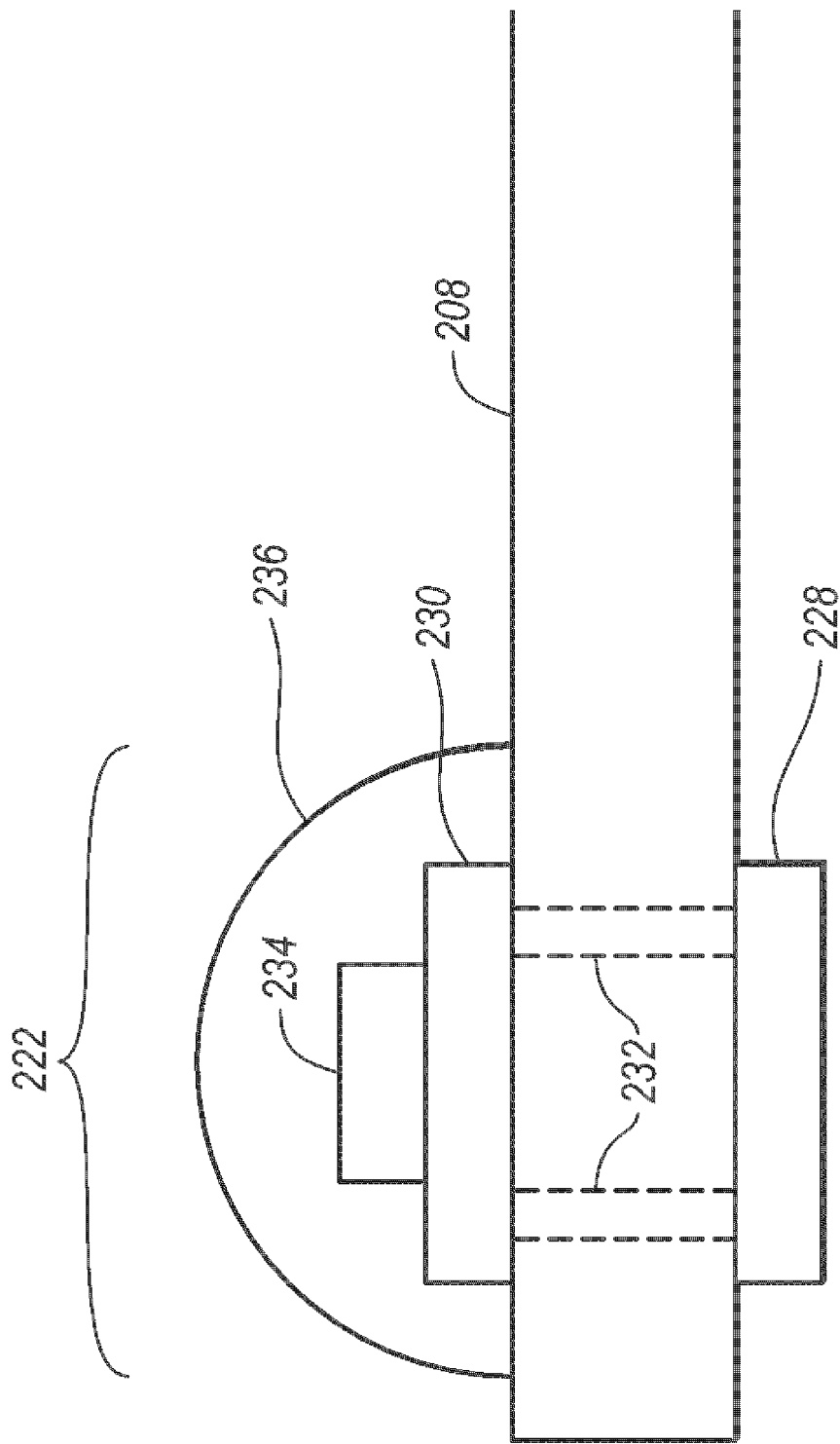
Figure 2D:
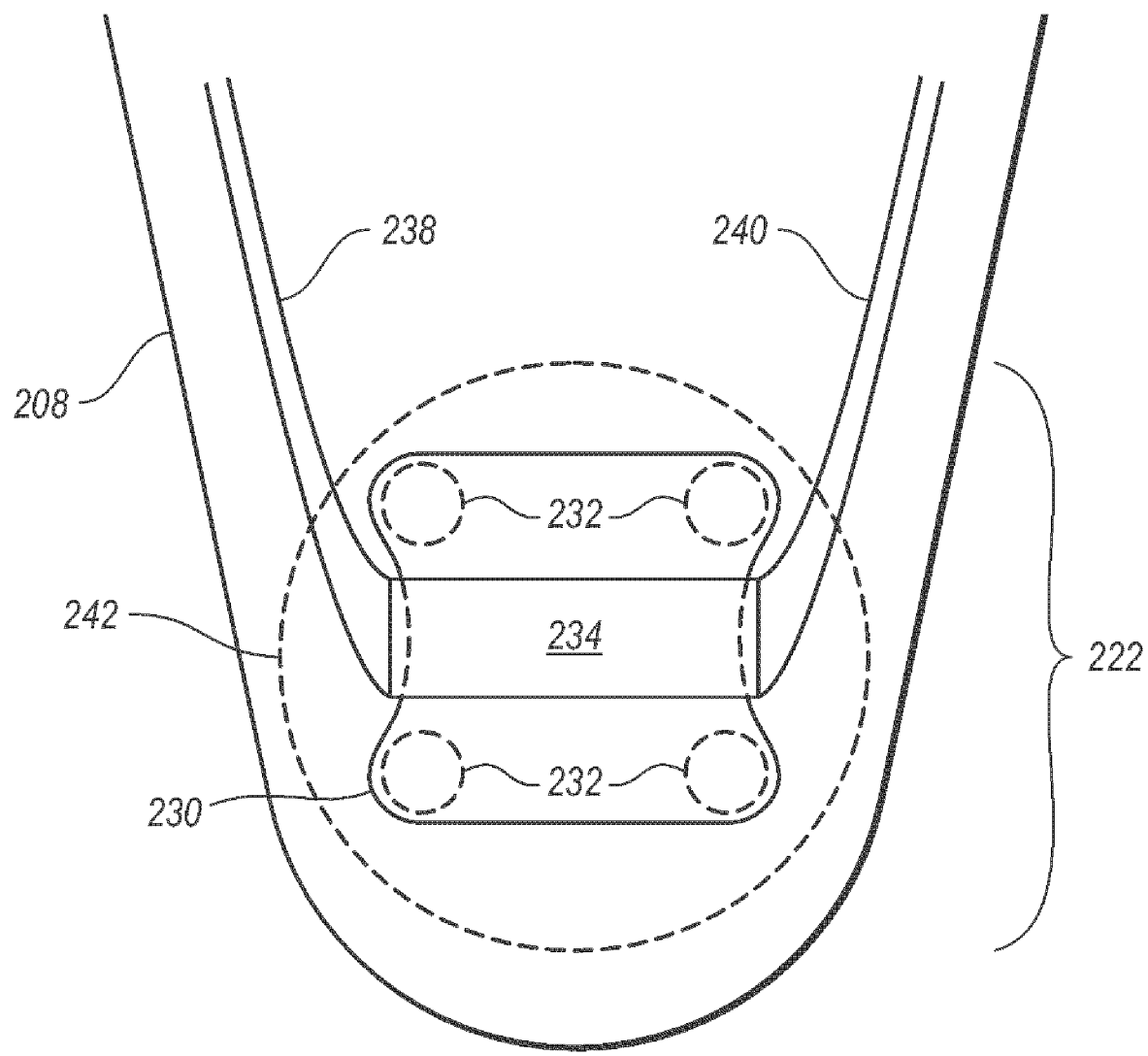

Some embodiments of the invention substantially prevent flowing air from interfering with temperature measurements of the DUTs. This may be accomplished in some embodiments by thermally shielding parts of a temperature sensor from the air. For example, FIGS. 2C and 2D illustrate an example embodiment of PTI temperature sensor 222 in which parts of the PTI temperature sensor 222 are thermally shielded from the air. Although not shown, PTI temperature sensors 216, 218, 220, 224 and 226 may be similarly configured to PTI temperature sensor 222.

FIG. 2C illustrates a cross-section of the fingertip 208 of FIG. 2A obtained by bisecting the fingertip 208 of FIG. 2A along the cutting plane line 2C of FIG. 2A. FIG. 2D illustrates a top view of the fingertip 208 of FIG. 2A.

As best seen in FIG. 2C, PTI temperature sensor 222 comprises a lower pad 228 disposed on one side of the finger 208 and an upper pad 230 disposed on the opposite side of the finger 208. The lower pad 228 and upper pad 230 are thermally coupled to each other through one or more vias 232 formed in the finger 208. The PTI temperature sensor 222 further comprises a resistor 234 coupled to the upper pad 230 and a thermal shield 236 cooperating with the finger 208 and lower pad 228 to enclose and partially thermally isolate the resistor 234 from heat exchange except through a thermal path defined by lower pad 228, vias 232, and upper pad 230.

The lower pad 228 may comprise a thin sheet of material having a high coefficient of thermal conductivity, such as copper or other suitable material(s). The vias 232 thermally couple the lower pad 228 to the upper pad 230. The vias 232 and upper pad 230 can comprise material(s) having a high coefficient of thermal conductivity and can be the same material(s) as the lower pad 228.

Alternately or additionally, the upper pad 230 may be of the same dimensions as the lower pad 228. In some embodiments, for instance, both the lower pad 228 and upper pad 230 are approximately 1 mil thick and approximately 157 mils by 157 mils high square. One of skill in the art can appreciate, with the benefit of the present disclosure, that the dimensions of the lower pad 228 and upper pad 230 can be different than the dimensions explicitly stated herein and/or that the lower pad 228 and upper pad 230 may have different dimensions from each other.

The resistor 234 is thermally coupled to the upper pad 230. The resistor 234 may have a variable resistance which changes predictably with changes in temperature. According to one embodiment, for example, the resistor 234 may comprise a platinum resistor having a resistance that varies linearly with temperature. Alternately or additionally, the resistor 234 may comprise other reasonable material(s).

As best seen in FIG. 2D, traces 238 and 240 may be coupled to each side of the resistor 234. The traces 238, 240 may run to and from a current source and/or measurement device. The resistance of the resistor 234—and consequently the temperature of the resistor 234—may be calculated by running a small amount of current through the resistor 234 and measuring the voltage drop across the resistor 234, for example.

The resistor 234 and upper pad 230 can be partially thermally isolated from everything except the lower pad by enclosing the resistor 234 and upper pad 230 in thermal shield 236. In FIG. 2D, the thermal shield 236 is not shown in order to depict more fully the resistor 234, upper pad 230 and traces 238 and 240. An outline of the surface area that may be covered by the thermal shield 236 is denoted in FIG. 2D by the hashed line 242.

In some embodiments, the thermal shield 236 may comprise an adhesive or other substance having a low coefficient of thermal conductivity, thereby minimizing the amount of heat transfer from the shield 236 to the resistor 234 and/or upper pad 230 and vice versa. The thermal shield 236 is configured to substantially prevent the resistor 234 and upper pad 230 from exchanging heat with anything other than the lower pad 228 through vias 306. The shielding effect of the thermal shield 236 combined with the high thermal conductivity of the lower pad 228, vias 232 and upper pad 230 permits the resistor 234 to measure temperature at the lower pad 228, which may be placed on a DUT to measure the temperature of the DUT.

Although a resistor can be placed directly on a DUT to measure the temperature of the DUT, air flow can reduce the accuracy of the measurement because it can carry heat to or from the resistor, thereby altering any measurements made by the resistor. The effect of the air flow on the temperature measurement depends on the ratio of the surface area of the resistor exposed to air to the surface area of the resistor in contact with the DUT. The effect of air flow is greater as this ratio increases. For a typical resistor, the surface area of the resistor exposed to air is usually large compared to the surface area of the resistor in contact with the DUT; as a result, the temperature measurements of the resistor can be greatly affected by air flow.

Some embodiments of the invention minimize the effects of air flow by partially thermally isolating the resistor 234 using the thermal shield 236. The resistor 234 is thermally coupled to the lower pad 228 through vias 232 and upper pad 230. The lower face of lower pad 228 can be placed in thermal contact with a DUT to measure the temperature of the DUT while the four sides can be exposed to air flow. According to some embodiments, the lower face of the lower pad 228 has an approximate surface area of 24,650 mil$^2$ (i.e., 157 mil by 157 mil), while the four sides have an aggregate surface area of approximately 628 mil$^2$ (i.e., 157 mil by 1 mil by 4 sides). When the lower pad 228 is placed in contact with a DUT to measure its temperature in this example, the ratio of the surface area exposed to air flow to the surface area in contact with the DUT is approximately 0.025 or 2.5%. Hence, a partially thermally isolated temperature sensor 222 such as the one described above can provide an accurate temperature reading even when in an environment of significant air flow because only 2.5% of the sensing surface area is exposed to the air. Alternately or additionally, PTI temperature sensors according to embodiments of the invention can provide accurate temperature readings in environments of significant air flow with more or less than 2.5% of the sensing surface area exposed to the air.

Figure 3A:
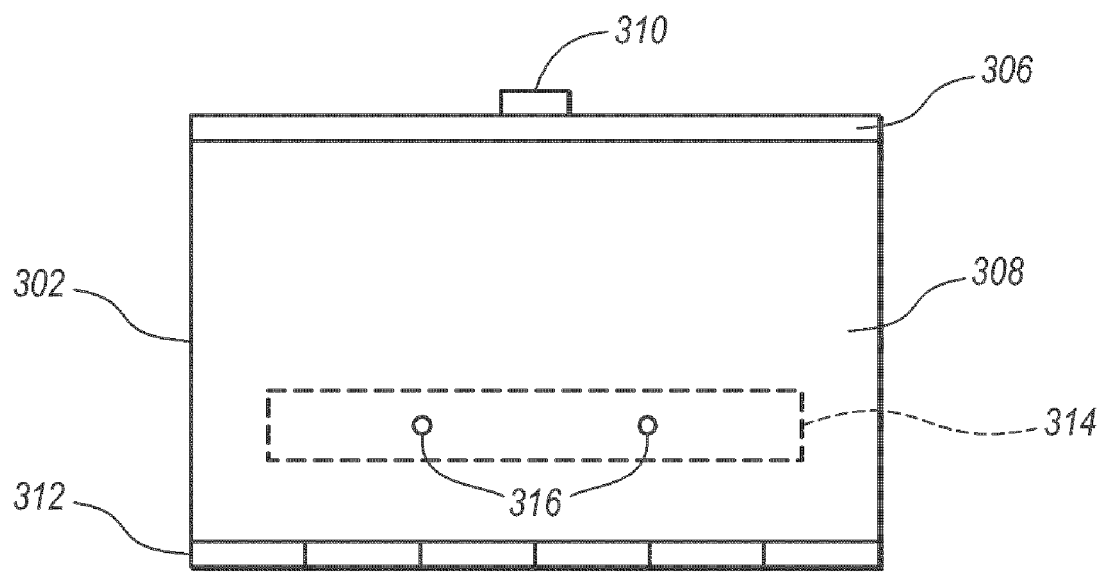
FIGS. 3A-3D depict various views of an example cover and a multi-fingered board that may be used in the operating environment of FIG. 1.

While the thermal shield 236 is configured to prevent air temperature, and particularly air flow, from affecting temperature measurements performed by PTI temperature sensors in contact with DUTs, it may be desirable to measure air temperature at times. For instance, the fingertip sensors 216-222 of multi-fingered board 200 (FIGS. 2A and 2B) can measure air temperature when there are no DUTs in a test box and they can measure temperatures of the DUTs when there are DUTs in the test box. Alternately or additionally, the additional sensors 224, 226 can be configured to measure air temperature with or without DUTs in the test box. FIGS. 3A-4 disclose how a multi-fingered board can be mounted to the cover of a test box to permit fingertip sensors to measure DUT temperatures while additional sensors measure air temperature.

IV. Cover and Multi-Fingered Board Configurations

In FIGS. 3A-3D various views of a cover 302 and multi-fingered board 304 are provided. The cover 302 and multi-fingered board 304 may correspond to the cover 134 and multi-fingered board 150 of the inner box 120 of FIG. 1, for example. FIGS. 3A, 3B, 3C and 3D disclose a top view, a bottom view, a right view and a left view, respectively, of the cover 302 and multi-fingered board 304.

As shown in FIGS. 3A-3D, the cover 302 includes a front plate 306, a top plate 308, a knob 310, means 312 for connecting the cover 302 to an inner test box, and a flange 314 to which the multi-fingered board 304 may be coupled. In some embodiments, the means 312 for connecting the cover 302 to an inner test box comprise a hinge.

Figure 3B:
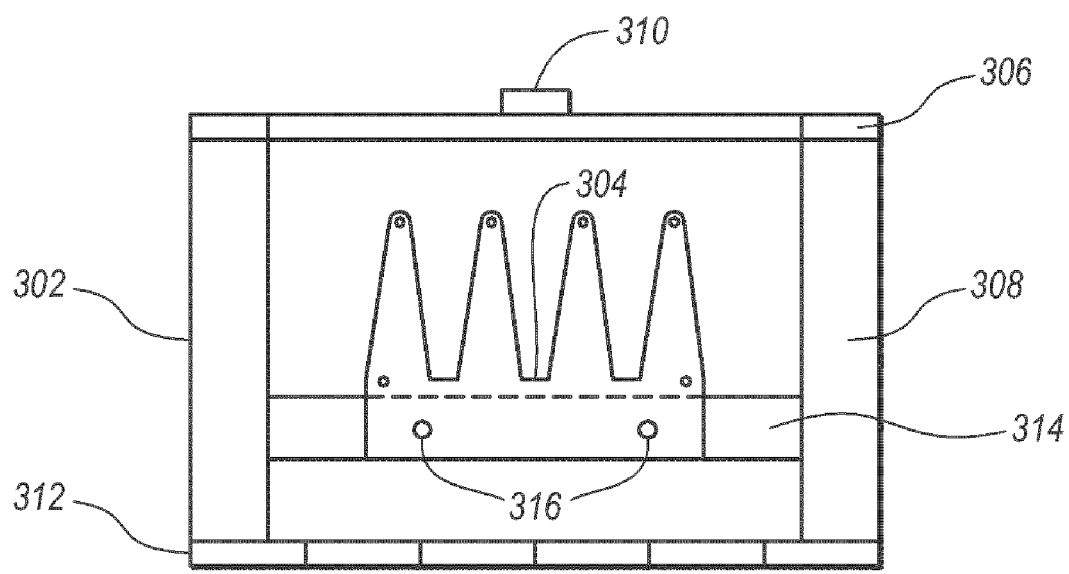
Figure 4:
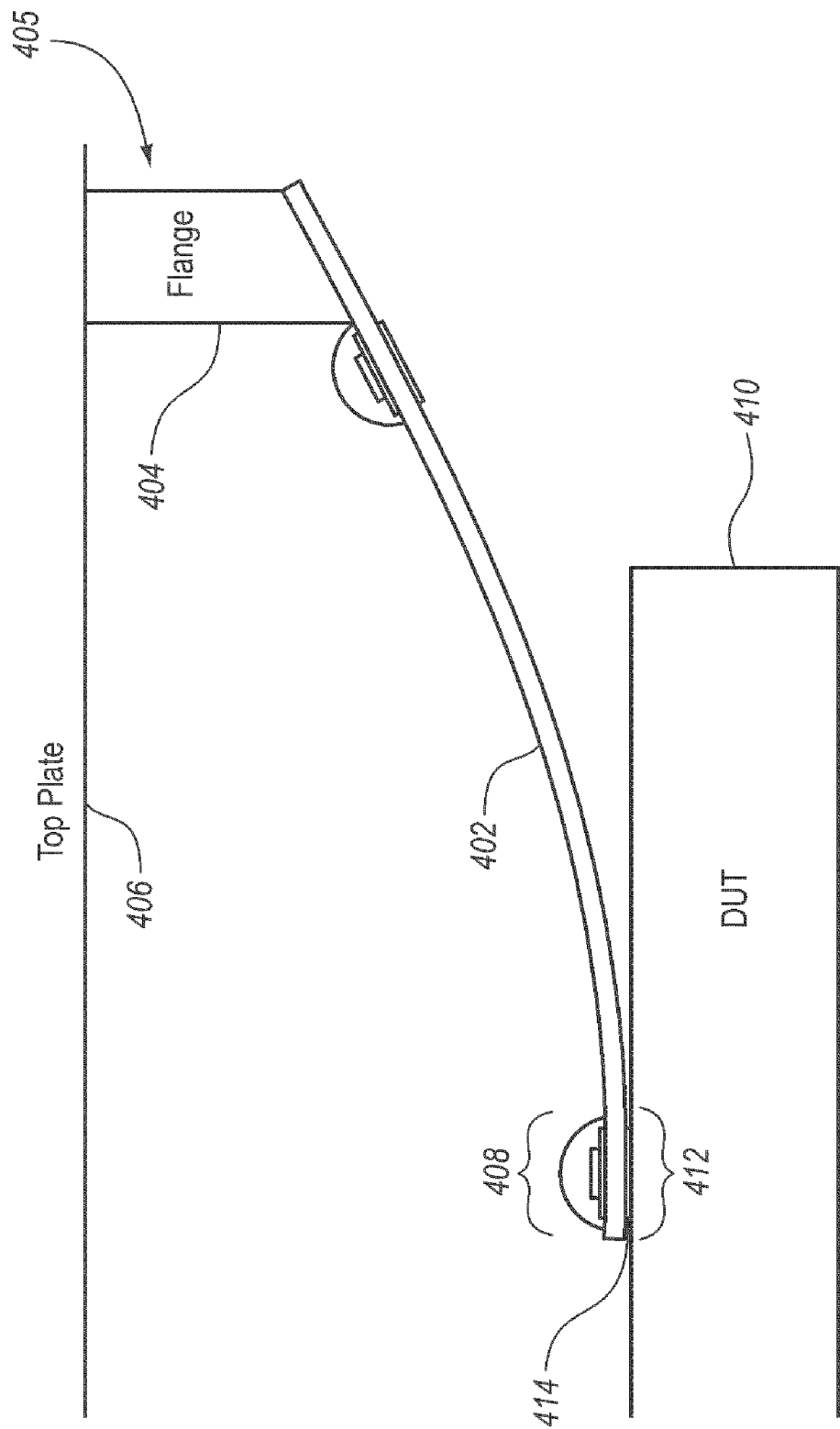
FIG. 4 illustrates the arrangement of a cover, multi-fingered board and device under test during calibration of the device under test.

FIGS. 3A and 3B further illustrate a plurality of through holes 316 which extend through the top plate 308 and flange 314 to the multi-fingered board 304. As previously discussed with respect to FIGS. 2A-2D, the multi-fingered board 304 can similarly include a plurality of through holes configured to align with the plurality of through holes 316 when the multi-fingered board 304 is positioned for installation to the cover 302. It is contemplated that the multi-fingered board 304 may be coupled to the cover 302 by inserting a screw, bolt or other fastening means through each of the plurality of through holes 316 of the cover 302 and corresponding through holes of the multi-fingered board 304.

In the event that the multi-fingered board 304 or any of its components malfunctions or ceases to work for any reason, the multi-fingered board 304 may easily be replaced without disassembling the test box within which the multi-fingered board 304 is installed. Indeed, removing the multi-fingered board 304 in one embodiment is as simple as unplugging a connector plugged into the connector area of the multi-fingered board 304 and unscrewing two screws which go through the two through holes 316 in the cover 302 of the test box into the two holes of the multi-fingered board 304. Installing a new multi-fingered board 304 is similarly simple, requiring two screws to be screwed into the through holes of the multi-fingered board 304 through the through holes 316 of the cover 302 of the test box and plugging in the connector to the connector area of the multi-fingered board 304.

Figure 3C:
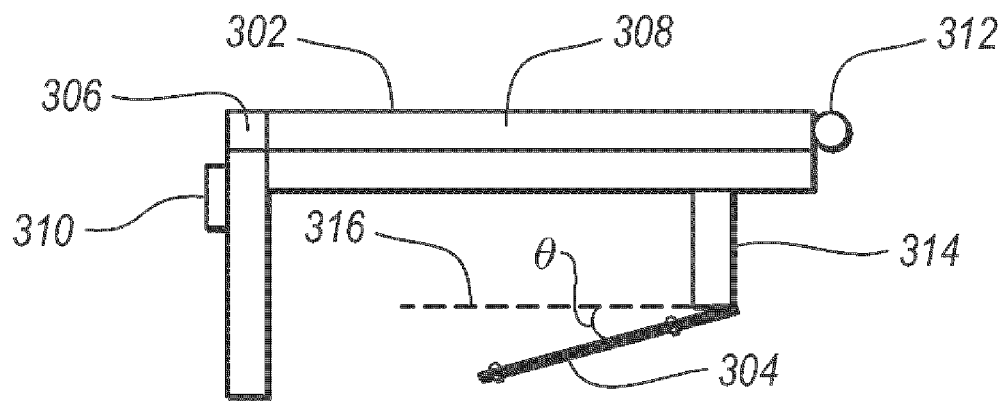
Figure 3D:
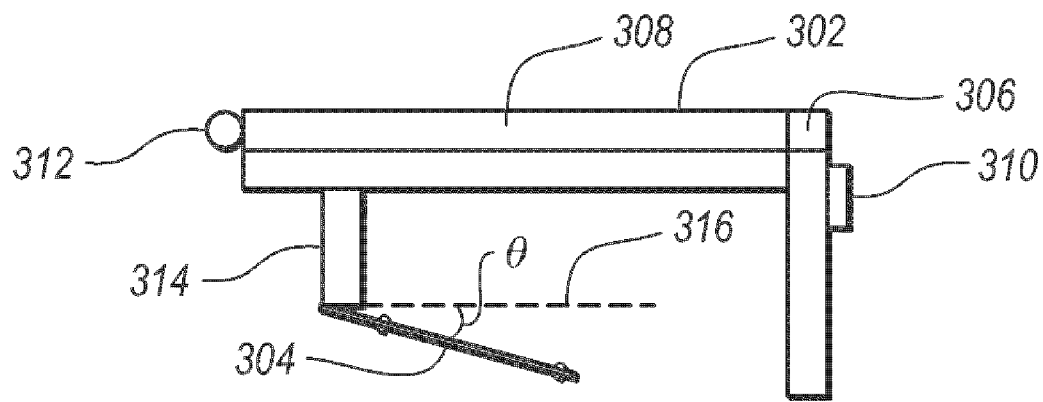

Turning now to FIGS. 3B, 3C and 3D, an example orientation of the multi-fingered board 304 relative to the cover 302 is disclosed. As can be seen in FIG. 3B, the base of the multi-fingered board 304 is coupled to the flange 314 with the fingers of the multi-fingered board 304 extending towards the front plate 306 of the cover 302. As best seen in FIGS. 3C and 3D, according to some embodiments the multi-fingered board 304 is oriented at an angle θ relative to the plane of the top plate 308. The reference line 316 of FIGS. 3C and 3D represents a plane substantially parallel to the plane of the top plate 308. The multi-fingered board 304 can be coupled to the flange 314 such that the fingers of the multi-fingered board 304 extend from the base of the multi-fingered board 304 at the angle θ relative to the plane of the top plate 308.

Figure 5:
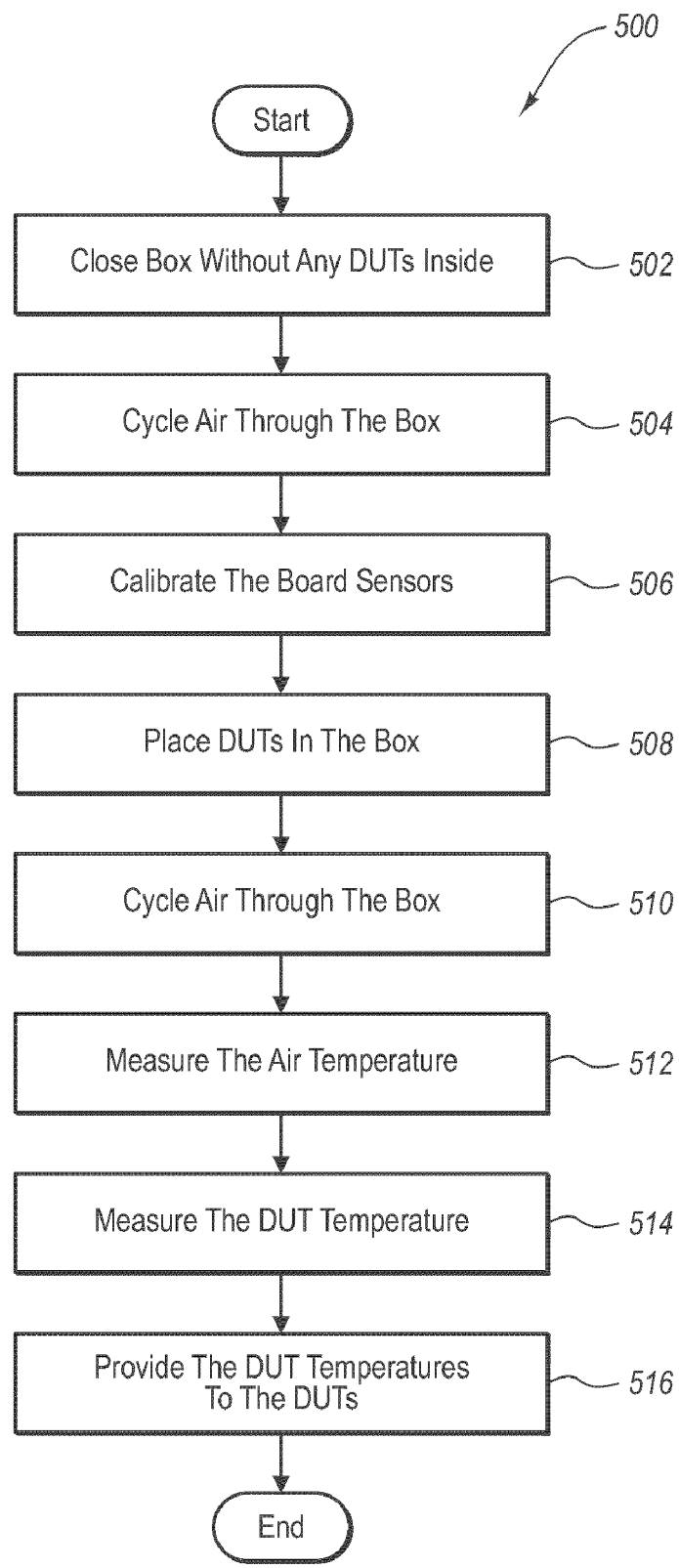
FIG. 5 is a flowchart depicting a process for calibrating internal temperature sensors of one or more devices under test.

The disposition of PTI temperature sensors on fingertips of a multi-fingered board permits temperature measurements to be taken from a specific area of a DUT in some embodiments. In FIG. 5, for example, a multi-fingered board 402 is coupled to a flange 404 of a cover 405 of an inner box. The multi-fingered board 402 can be coupled to the flange 404 at an angle relative to the plane of top plate 406. In the present example, a fingertip sensor 408 on the multi-fingered board 402 is in thermal contact with an area 412 of a DUT 410 in order to measure the temperature of the DUT 410. In some embodiments, the area 412 may be an area of the DUT 410 that is proximate a heat-generating source of the DUT 410, such as directly above an optical transmitter within the DUT 410. The dimensions of the multi-fingered board 402 and the placement of the fingertip sensor 408 on a finger of the multi-fingered board 402 may be specifically configured so as to measure the temperature of almost any particular area of a DUT.

According to some embodiments of the invention, the multi-fingered board 402 comprises a flexible material, as previously noted above. In some embodiments, the flex of the multi-fingered board 402 can permit the lower surface of a lower pad 414 of fingertip sensor 408 to be substantially in parallel contact with the surface of the DUT 410, even though the multi-fingered board 402 may be mounted at an angle relative to the plane of the top plate 406. In particular, the proximity of the multi-fingered board 402 to the DUT 410, the angle that the multi-fingered board 402 is mounted to the flange 404, and the flexibility and dimensions of the multi-fingered board 402 can be such that as the cover 405 is closed, the multi-fingered board 402 resiliently deforms until the lower surface of lower pad 414 is substantially in parallel contact with the surface of the DUT 410 in the area 412.

Furthermore, in the example of FIG. 4, the multi-fingered board 402 can exert a force on the DUT 410 at the area 412 through lower pad 414 as a result of the resilient deformation of the multi-fingered board 402. The parallel contact of the lower pad 414 with the DUT 410 combined with the force on the DUT 410 at the area 412 can maximize thermal conductivity between the DUT 410 and the lower pad 414.

V. Temperature Sensor Calibration

With additional reference to FIG. 5, a method 500 is described for calibrating internal temperature sensors of one or more DUTs. The calibration of the internal sensors may be performed in a test box having a multi-fingered board such as the multi-fingered boards 150, 200, 304, 402 of FIGS. 1-4. The multi-fingered board can include a plurality of PTI temperature sensors. In some embodiments, a master system regulates the temperature within the test box by reducing or increasing the temperature of air cycled through the test box. Alternately or additionally, the master system can include a master sensor disposed within the test box.

The method 500 can begin by closing 502 the test box without any DUTs inside. The master system cycles 504 air through the box for the purpose of calibrating 506 the PTI temperature sensors of the multi-fingered board. The temperature of the air cycled through the test box may vary according to a pre-programmed temperature profile. For instance, the master system may cycle air through the test box beginning at minus 45 degrees Celsius and slowly raising the temperature to 85 degrees Celsius.

Alternatively, the PTI temperature sensors placed on fingers of the multi-fingered board can be monitored using the master sensor inside the box that is not in contact with any DUT. This master sensor can monitor the air temperature at the same time that the PTI temperature sensors collect temperature data from the DUTs. In this example, temperatures can be monitored and PTI temperature sensors calibrated at the same time. In this example, the method may begin by placing the DUTs in the test box and then measuring the air temperature and the temperature of the DUTs at the same time.

The PTI temperature sensors of the multi-fingered board are calibrated 506 using temperature measurements provided by the master sensor (referred to herein as "master measurements") combined with temperature measurements provided by the PTI temperature sensors. At a number of periodic intervals, which may be regular or irregular, the master sensor measures the temperature within the test box and provides a master measurement to a processor, which may communicate with the multi-fingered board. The processor compares a master measurement, such as temperature A, to measurements obtained by PTI temperature sensors, such as temperatures B, C, D, etc., and records any variance in a memory associated with the multi-fingered board. If temperature B obtained by a first PTI temperature sensor is different than temperature A, the processor may update a table stored in memory to reflect that when the first PTI temperature sensor measures temperature B, this corresponds to an actual temperature A. For instance, the master sensor may measure the temperature within the test box to be −39 degrees. At the same time, the first PTI temperature sensor may measure the temperature within the test box to be −41 degrees. The table stored in memory would be updated to reflect that when the first PTI temperature sensor measures −41 degrees, the actual temperature is −39 degrees.

After calibrating the PTI temperature sensors of the multi-fingered board, the box may be opened and one or more DUTs may be placed 508 in test slots of the test box. Optical fibers may be plugged into the optical interface of each DUT at this time. The other end of the optical fibers may be plugged into a BERT. In a typical embodiment, the BERT supplies a test electrical signal to each DUT, each DUT converts a test electrical signal into an optical signal, and the BERT receives the optical signals produced by the DUTs. The BERT analyzes the optical signals and counts the number of transmission errors in each to determine whether operating parameters (such as transmitter bias currents) of the DUTs need adjustment to reduce transmission errors. The BERT can "train" a DUT to properly adjust its own operating parameters out in the field by instructing the DUT how to adjust its operating parameters at various operating temperatures. The test box provides an environment in which temperatures can be accurately measured so that internal temperature sensors of the DUTs—not to be confused with the PTI temperature sensors of the multi-fingered board—can be calibrated during this training process.

To that end, the test box is closed with the DUTs inside and the DUTs are operated by the BERT. The master system cycles 510 air through the box once again and varies the temperature of the air according to the pre-programmed (or some other) temperature profile. At various intervals, the temperature of the air within the test box is measured 512 and may be supplied to the BERT. According to one embodiment, the temperature within the test box is measured by one or both of the two additional sensors of the multi-fingered board. Because the PTI temperature sensors of the multi-fingered board have already been calibrated, the two additional sensors can be relied on to give an accurate measurement of the air inside the test box. Additionally, the four fingertip sensors can be relied on to give accurate operating temperature measurements as they have been calibrated also.

At the same time that the air temperature inside the box is measured, the fingertip PTI temperature sensors measure 514 the temperature of each DUT. The PTI temperature sensor measurement for each DUT is provided 516 to the corresponding DUT. For instance, the temperature measurement of the first PTI fingertip sensor may be provided to a processor through the connector area of the multi-fingered board, and the processor may provide the temperature measurement over I²C lines to the corresponding DUT. The DUT compares the PTI temperature measurement to a temperature measurement obtained by its own internal temperature sensor and updates a table stored in EEPROM or some other type of memory of the DUT to reflect any variance from the PTI measurement. If the first PTI measured the temperature of the DUT as 45 degrees, but the internal sensor measured the temperature of the DUT as 38 degrees, the table would be updated to reflect that when the DUT internal sensor measures 38 degrees, this corresponds to an actual temperature of 45 degrees. The master system can continue to change the air temperature within the test box according to a temperature profile while the PTI fingertip sensors provide temperature measurements to each DUT and the BERT trains each DUT to adjust operating parameters according to the actual operating temperature of the DUT.

Those skilled in the art will recognize that the test box may be used to test other aspects of the DUTs in addition to calibrating the internal temperature sensors of the DUTs and training the DUTs to adjust operating parameters according to the actual operating temperatures of the DUTs.

The method 500 has been described by way of example only, and not by way of restricting the scope of the invention. For instance, the steps of the method 500 can be performed in a different order than explicitly stated herein. Alternately or additionally, one or more steps can be added to the method 500. Alternately or additionally, one or more steps can be omitted from the method 500.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A board for measuring device temperatures, comprising:
    a base;
    one or more fingers extending from the base, the base and the one or more fingers comprising a flexible material;
    one or more first temperature sensors disposed on the one or more fingers; and
    one or more second temperature sensors disposed on the base, the first and second temperature sensors comprising partially thermally isolated temperature sensors.

2. The board of claim 1, further comprising a connector area electrically coupled to each of the first and second temperature sensors and configured to communicate electrical signals to and from the board.

3. The board of claim 2, wherein the electrical signals comprise one or more of: supply current for the first and second temperature sensors or temperature data from the first and second temperature sensors.

4. The board of claim 1, wherein each of the first and second temperature sensors comprises:
    a lower pad disposed on a first side of the board;
    an upper pad disposed on a second side of the board that is opposite the first side;
    one or more vias formed in the board and thermally coupling the lower pad to the upper pad, wherein each of the lower pad, the upper pad, and the one or more vias have a high coefficient of thermal conductivity;
    a resistor thermally coupled to the upper pad, wherein the resistance of the resistor varies predictably with the temperature of the resistor; and
    a thermal shield cooperating with the board and lower pad to enclose and partially thermally isolate the resistor from heat exchange except through the lower pad, one or more vias, and upper pad.

5. The board of claim 4, wherein each of the lower pad, the upper pad, and the one or more vias comprise copper.

6. The board of claim 4, wherein the lower pad is approximately 1 mil thick and a lower surface of the lower pad is approximately 157 mils by 157 mils square.

7. The board of claim 4, wherein the resistor comprises a platinum resistor.

8. The board of claim 4, wherein the thermal shield comprises thermal adhesive having a low coefficient of thermal conductivity.

9. A system for calibrating a plurality of devices, the system comprising:
    a test box, the test box including:
        a cover;
        a first opening for receiving temperature-regulated air;
        a second opening for discharging the temperature-regulated air; and
        one or more test slots for receiving one or more devices; and
    a board coupled to the cover, the board comprising one or more fingers and a plurality of partially thermally isolated temperature sensors, the plurality of partially thermally isolated temperature sensors exceeding in quantity the one or more fingers;
    wherein when the cover is closed and one or more devices are received in the one or more test slots, one or more of the plurality of partially thermally isolated temperature sensors are thermally coupled to the one or more devices.

10. The system of claim 9, further comprising a Bit Error Rate Tester communicatively coupled to the board through a connector area of the board and configured to measure a bit error rate of each of the one or more devices.

11. The system of claim 9, further comprising a master system coupled to the box at the first opening and second opening, the master system configured to regulate the temperature of the temperature-regulated air.

12. The system of claim 9, wherein the cover comprises a top plate and the board is coupled to the cover at an angle relative to the top plate.

13. The system of claim 12, wherein the board is configured to resiliently deform against the one or more devices when the cover is closed and exert a force on the one or more devices through the one or more of the plurality of partially thermally isolated temperature sensors to maximize thermal conductivity between the one or more devices and the one or more of the plurality of partially thermally isolated temperature sensors.

14. The system of claim 9, wherein the board further comprises a base and the plurality of partially thermally isolated temperature sensors comprise a first set of temperature sensors disposed on the one or more fingers and a second set of temperature sensors disposed on the base, each of the first set of sensors configured to be thermally coupled to and to measure the temperature of a corresponding one of the one or more devices and each of the second set of sensors configured to measure the temperature of the temperature-regulated air.

15. The system of claim 14, wherein each of the first set of sensors is configured to be thermally coupled to a corresponding one of the one or more devices in an area of each device that is proximate a heat-generating source of the device.

16. The system of claim 15, wherein the heat-generating source comprises an optical transmitter.

17. The system of claim 9, wherein the box comprises an inner test box, the system further comprising an outer box, the inner test box being disposed within the outer box to substantially prevent condensation from forming on the inner test box during operation.

18. A method for calibrating one or more internal temperature sensors of one or more devices, the method comprising:
    cycling temperature-regulated air through a test box, master measurements of the temperature of the temperature-regulated air being periodically obtained by a master sensor;
    calibrating a plurality of partially thermally isolated temperature sensors included on a board in the test box;
    placing one or more devices within the test box, each device having one or more internal temperature sensors;
    operating the one or more device within the test box;
    measuring operating temperatures of the one or more devices using at least one of the plurality of partially thermally isolated temperature sensors; and
    providing the operating temperature measurements to the one or more devices, wherein each of the one or more devices compares operating temperature measurements corresponding to the device to operating temperature measurements obtained by the device's one or more internal temperature sensors and records any variance in the memory of the device.

19. The method of claim 18, further comprising, training each of the one or more devices to adjust its own operating parameters at various operating temperatures.

20. The method of claim 18, wherein calibrating a plurality of partially thermally isolated temperature sensors comprises:

comparing each master measurement to a corresponding measurement obtained by each of the plurality of partially thermally isolated temperature sensors; and recording any variance between each master measurement and the corresponding measurement obtained by each of the plurality of partially thermally isolated temperature sensors in a memory associated with the board.

* * * * *